US011862879B2

(12) United States Patent
Boryssenko

(10) Patent No.: US 11,862,879 B2
(45) Date of Patent: Jan. 2, 2024

(54) ANTENNA ELEMENTS AND ARRAY

(71) Applicant: SI2 Technologies, Inc., North Billerica, MA (US)

(72) Inventor: Anatoliy Boryssenko, Belchertown, MA (US)

(73) Assignee: SI2 Technologies, Inc., North Billerica, MA (US)

( * ) Notice: Subject to any disclaimer, the term of this patent is extended or adjusted under 35 U.S.C. 154(b) by 72 days.

(21) Appl. No.: 17/699,843

(22) Filed: Mar. 21, 2022

(65) Prior Publication Data

US 2022/0359990 A1 Nov. 10, 2022

Related U.S. Application Data

(63) Continuation of application No. 16/927,827, filed on Jul. 13, 2020, now Pat. No. 11,283,176, which is a continuation of application No. 16/685,939, filed on Nov. 15, 2019, now abandoned, which is a continuation of application No. 14/072,432, filed on Nov. 5, 2013, now Pat. No. 10,516,214.

(51) Int. Cl.

| | |
|---|---|
| ***H01Q 9/16*** | (2006.01) |
| ***H01Q 21/00*** | (2006.01) |
| ***H01Q 9/06*** | (2006.01) |
| ***H01Q 21/06*** | (2006.01) |

(52) U.S. Cl.

CPC ............... *H01Q 9/16* (2013.01); *H01Q 9/065* (2013.01); *H01Q 21/0006* (2013.01); *H01Q 21/062* (2013.01)

(58) Field of Classification Search

CPC ...... H01Q 9/16; H01Q 9/065; H01Q 21/0006; H01Q 21/062

See application file for complete search history.

(56) References Cited

U.S. PATENT DOCUMENTS 3,740,754 A * 6/1973 Epis ........................ H01Q 13/18 343/822
4,062,019 A * 12/1977 Woodward ............. H01Q 21/26 343/797
4,686,536 A * 8/1987 Allcock ................. H01Q 9/065 343/797
4,717,896 A 1/1988 Graham
4,924,236 A 5/1990 Schuss et al.
5,220,335 A 6/1993 Tuang (Continued)

OTHER PUBLICATIONS

Token, “Surface Mount Balun Transformer General Information,” http://www.token.com.tw/, published: 2010.

(Continued)

*Primary Examiner* — Hai V Tran
*Assistant Examiner* — Bamidele A Immanuel
(74) *Attorney, Agent, or Firm* — DLA Piper LLP (US)

(57) ABSTRACT

Antenna elements are described that may include a radiator, a feeding portion, a first impedance transformer, a balun, and a second impedance transformer. The first impedance transformer, balun, and second impedance transformer may be disposed above a ground plane of an antenna array to reduce a bulk of the array. The array can also include a dielectric top layer for loading apertures of the antenna array. The antenna elements can also include anomaly suppressors can be provided to cancel common-mode resonances from the radiators.

14 Claims, 7 Drawing Sheets

(56) References Cited

U.S. PATENT DOCUMENTS 5,488,380 A * 1/1996 Harvey .............. H01Q 21/0087 333/248
5,587,692 A 12/1996 Graham
5,966,102 A * 10/1999 Runyon ................. H01Q 21/08 343/820
6,005,522 A 12/1999 Arias et al.
6,034,649 A * 3/2000 Wilson ..................... H01Q 9/28 343/797
6,819,200 B2 11/2004 Zhao et al.
7,098,863 B2 8/2006 Bancroft
7,119,745 B2 * 10/2006 Gaucher .................. H01Q 9/26 343/846
7,477,204 B2 1/2009 Lin et al.
8,022,887 B1 9/2011 Zarnaghi
10,516,214 B2 12/2019 Boryssenko
11,283,176 B2 3/2022 Boryssenko
2004/0017266 A1 1/2004 Zhao
2004/0017315 A1 1/2004 Fang et al.
2004/0263410 A1 * 12/2004 Teillet ...................... H01Q 3/32 343/797
2006/0001572 A1 1/2006 Gaucher et al.
2008/0246680 A1 * 10/2008 Rawnick ................ H01Q 21/00 343/810
2009/0140824 A1 * 6/2009 Hu ............................ H01P 5/10 333/26
2009/0204372 A1 * 8/2009 Johnston .................. H01Q 5/40 342/357.76
2009/0256778 A1 10/2009 Du
2010/0117914 A1 5/2010 Feller et al.
2010/0164810 A1 * 7/2010 Chou ..................... H01Q 21/24 343/700 MS
2010/0245202 A1 9/2010 Lewis et al.
2010/0277389 A1 * 11/2010 Kikin ..................... H01Q 21/24 343/843
2010/0283700 A1 * 11/2010 Rajanish ................. H01L 24/48 343/793
2011/0199272 A1 8/2011 He et al.
2013/0082890 A1 4/2013 Wang et al.
2015/0200460 A1 7/2015 Isom et al.
2015/0263434 A1 * 9/2015 Bench ...................... H01Q 5/48 343/879
2020/0009161 A1 1/2020 Matthews et al.

OTHER PUBLICATIONS

Revankar et al. "Printed Dipole Radiating Elements for Broadband and Wide Scan Angle Active Phased Array" IEEE Antennas and Propagation Society International Symposium. 2001 Digest. Held in conjunction with: USNC/URSI National Radio Science Meeting(Cat. No. 01CH37229) (Year: 2001).

Chuang et al. "3-D Fdtd Design Analysis of a 2.4-GHz Polarization-Diversity Printed Dipole Antenna With Integrated Balun and Polarization-Switching Circuit for WLAN and Wireless Communication Applications", IEEE Transactions on Microwave Theory andTechniques, vol. 51, No. 2, Feb. 2003 (Year: 2003).

* cited by examiner

ANTENNA ELEMENTS AND ARRAY

CROSS-REFERENCE TO RELATED APPLICATIONS

This application is a Continuation of U.S. patent application Ser. No. 16/927,827 filed Jul. 13, 2020, which is a Continuation of U.S. patent application Ser. No. 16/685,939 filed Nov. 15, 2019 titled "Antenna Elements and Array", now abandoned, which is a Continuation of U.S. patent application Ser. No. 14/072,432 filed Nov. 5, 2013 titled "Antenna Elements and Array", now U.S. Pat. No. 10,516, 214 issued Dec. 24, 2019. The prior applications are incorporated herein by reference.

GOVERNMENT RIGHTS

This invention was made with government support under contract number N68936-09-C-0026 awarded by the U.S. Department of Defense. The government has certain rights in the invention.

BACKGROUND

Antenna arrays include a group of radiating elements whose currents can be of different amplitudes and/or phases, and can operate in conjunction to provide improved bandwidth over a single radiator operating in an array environment. Additionally, antenna arrays can enhance the radiative signal in a desired direction and/or diminish it in non-desired directions. Hence, antenna arrays are a useful tool in electromagnetics. Antenna arrays can include a linear array of antennas arranged in a straight line, a plane array of antennas arranged in two dimensions (e.g., a grid), a three-dimensional array, etc.

Current antenna arrays like broadband current sheet arrays, however, are typically bulky and have a high amount of loss. For example, current antenna arrays require nearly quarter wavelength (λ) height or cavity depth between the antenna and a conductor ground plane, where the ground plane typically includes flat metal sheets used to enable directive radiation from the antenna area. In addition, the current antenna arrays employ certain components that are placed beneath the array ground plane. These limitations of the current array antennas can result in extra volume added to the array (particularly below the ground plane), greater loss experienced in receiving transmissions from the antenna array due to the wavelength height/cavity depth requirements, impedance scanning anomalies (e.g., where impedance components are included beneath the ground plane), etc.

SUMMARY

The following presents a simplified summary of one or more aspects to provide a basic understanding thereof. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

Embodiments described herein relate to an antenna array, or related antenna elements, formed by coupled dipoles printed on vertically stacked dielectric boards. An example antenna array includes a dielectric top layer that provides loading of the antenna elements and/or their matching to free space and a bottom ground plane to receive the antenna elements and/or assist in transmitting and/or receiving radio waves for the antenna elements. In addition, the antenna elements can include, among other components, integrated impedance matching network components printed on the dielectric board to facilitate transformation of the impedance. The impedance matching network components can be integrated on each, or at least a portion of, the antenna elements. Moreover, the antenna elements may include integrated common-mode cancellation network components, such as one or more chip resistors, for cancelling common-mode resonances that may be excited in feed lines when antenna elements are radiating and scanning off broadside.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations may denote like elements.

DETAILED DESCRIPTION

Reference will now be made in detail to various aspects, one or more examples of which are illustrated in the accompanying drawings. Each example is provided by way of explanation, and not limitation of the aspects. In fact, it will be apparent to those skilled in the art that modifications and variations can be made in the described aspects without departing from the scope or spirit thereof. For instance, features illustrated or described as part of one example may be used on another example to yield a still further example. Thus, it is intended that the described aspects cover such modifications and variations as come within the scope of the appended claims and their equivalents.

Described herein are various aspects relating to antenna arrays comprising a plurality of antenna elements formed as coupled dipoles or other radiating elements on vertically stacked dielectric boards. The antenna elements can also comprise integrated impedance transformers, baluns, and/or the like to provide transformation of impedance, compatibility with unbalanced transmission lines, etc. Moreover, in some examples, the antenna elements can include one or more resistors or other components to cancel common-mode resonances. The antenna array includes a bottom ground plane to receive the plurality of antenna elements and enable directive radiation from the area that receives the antenna elements, and a dielectric top cover to provide loading on the top or aperture side of the antenna array to increase bandwidth and/or impedance matching. The integrated components of antenna elements can be disposed on a portion of the antenna elements that are situated above the ground plane to reduce bulk of the antenna array below ground plane (e.g., where feed network electronics and/or other electronics are typically deployed), and thus in the total size of the antenna array.

Antenna arrays, as described herein, can be used to overcome the limitations of operating a single antenna. For example, dipole antennas allow for improved control of directional radiation over isotropic (omni-directional) antennas, though as the length of the dipole increases, the control of directionality decreases. Hence, control by changing the length of a single antenna may be limited. An arrangement of multiple antennas in an array can provide greater flexibility and control for directing the beam, as well as improved bandwidth. In addition, antenna arrays described herein can include broadband current sheet arrays (CSA) (e.g., tightly coupled dipole arrays) or similar radiating antenna element configurations.

Figure 1:
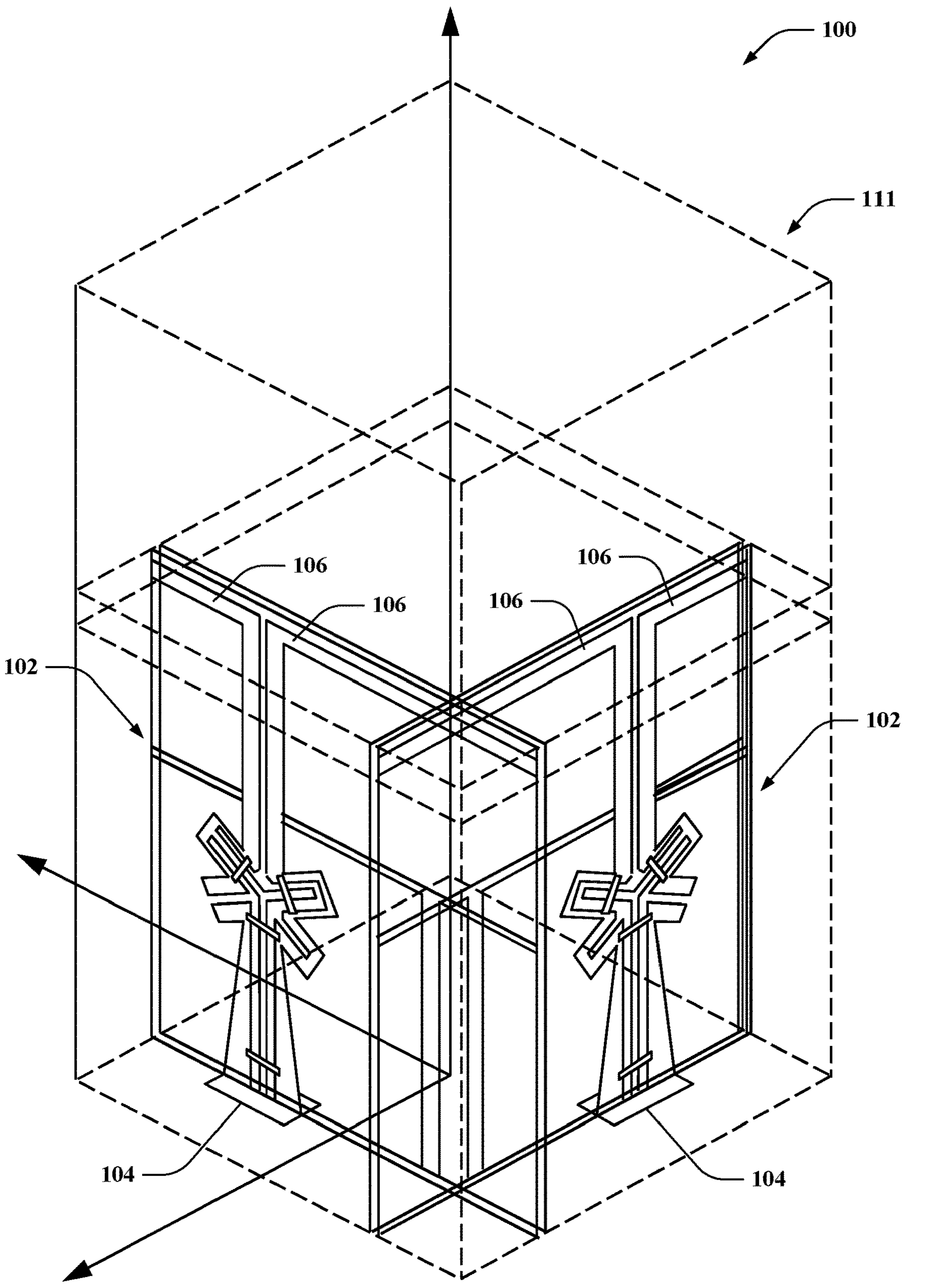
FIG. 1 illustrates a perspective view of antenna elements of an antenna array according to an embodiment.
Figure 2:
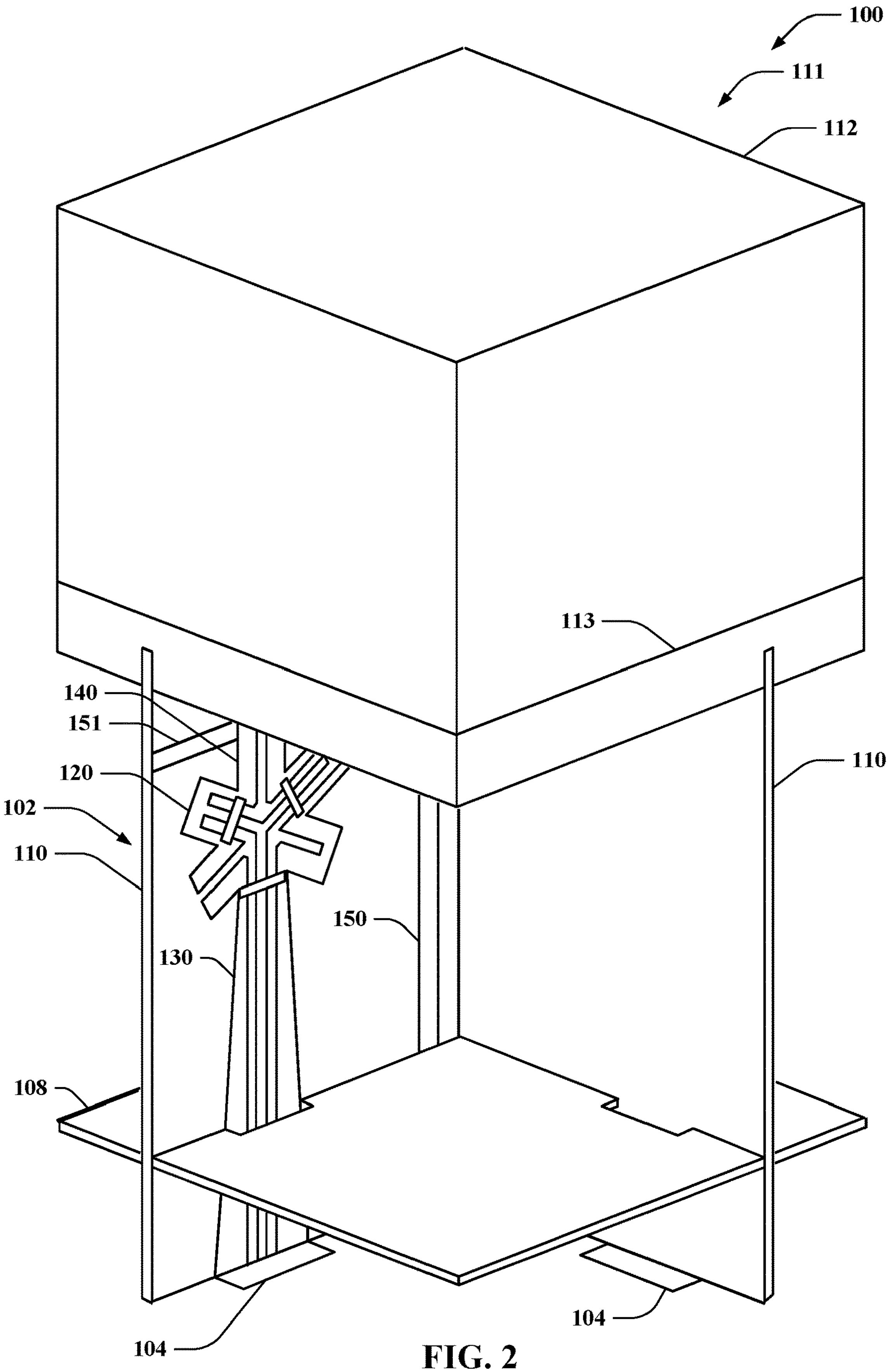
FIG. 2 illustrates a perspective view of antenna elements of an antenna array according to an embodiment.
Figure 3B:
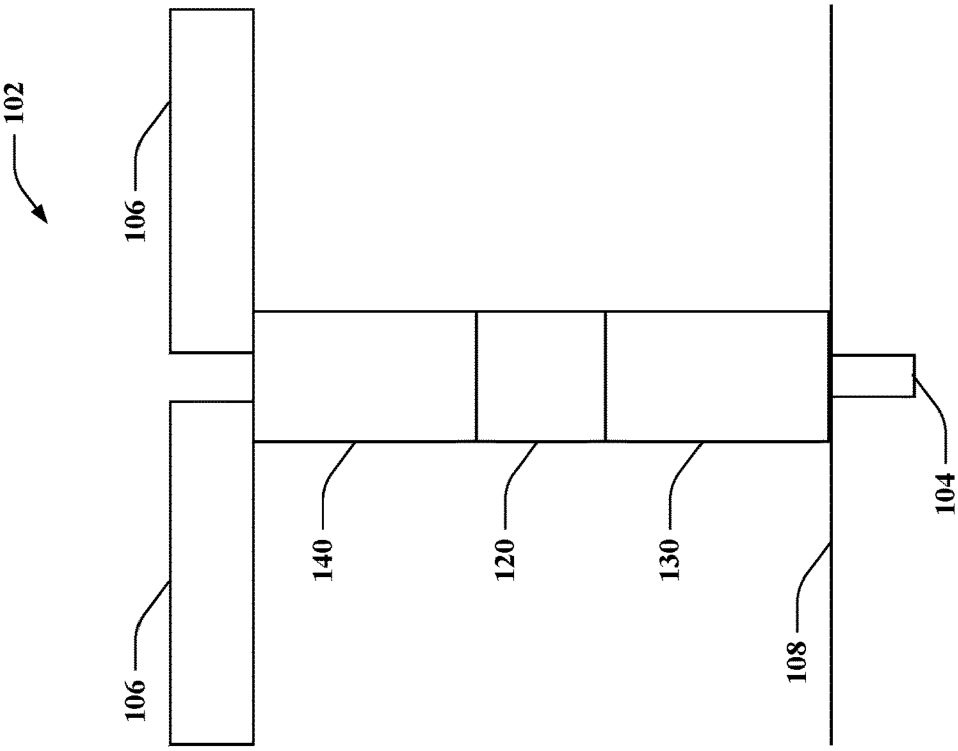
FIG. 3B illustrates a component view of an antenna element according to an embodiment.
Figure 3A:
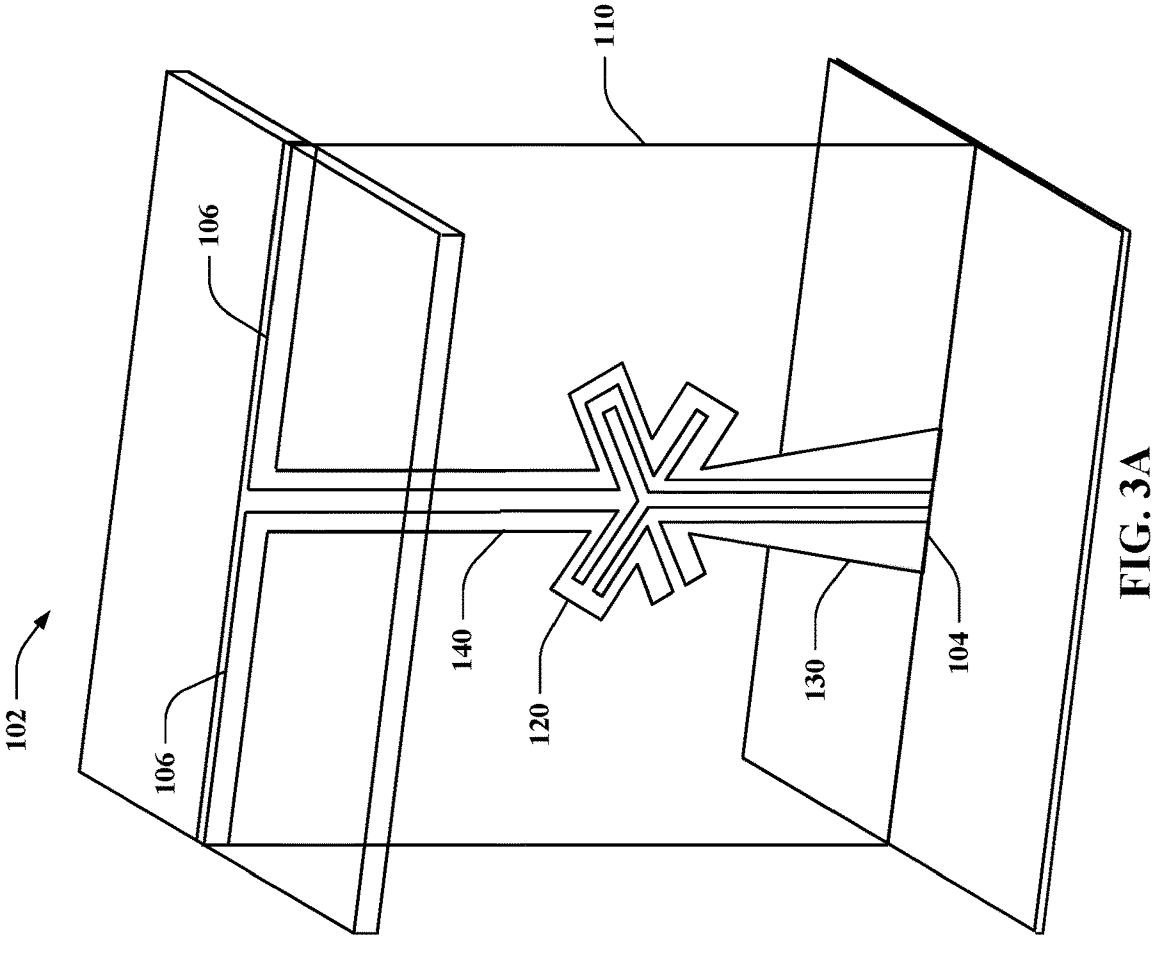
FIG. 3A illustrates a perspective view of an antenna element according to an embodiment.

FIGS. 1 and 2 illustrate perspective views of a portion of an antenna array 100 including two adjacent antenna elements 102, which can also be referred to generally as radiators. FIG. 3A illustrates a front view of an example antenna element 102, and FIG. 3B illustrates a conceptual view of an example antenna element 102. Each antenna element 102 includes a feed portion 104, which can include a connector, resistor, transmit-receive front-end electronic circuits, or other element feed to provide or receive an electrical signal source to/from the antenna element 102. The antenna element 102 can also include one or more antenna arm elements 106 that form a two-arm symmetrical radiator. In one example, the antenna arm elements 106, which can be referred to herein as radiator arms, radiating elements, dipole arms, etc., can include two dipole arms to provide a dipole antenna.

The antenna array 100 can include a ground plane having a top portion 108 configured to receive the antenna elements 102. In one example, the feed portion 104 can be disposed on the ground plane top portion 108, and coupled to the antenna element 102 inserted into the top portion 108. The feed portion 104, in one example, can extend through the ground plane to allow attaching of a cable, transmit or receive electronic components, or other signal transmission devices to the feed portion 104.

Moreover, for example, the antenna elements 102 can include dielectric boards 110 that provide various components of the antenna elements 102. In an example, the dielectric boards 110 can be printed circuit boards (PCB) upon which electronics for the various components of the antenna elements 102 are etched or otherwise printed.

The antenna array 100 also includes a dielectric top cover 111 that includes one or more layers 112 and 113. The layers 112 and 113 can comprise a low-loss dielectric material, which can improve impedance matching and bandwidth enhancement for the antenna elements 102. For example, the dielectric top cover 111 provides dielectric loading in apertures formed by various antenna elements 102 of the antenna array 100 through one or more of the layers 112 and 113. As a result, the dipole arms 106 can be placed above the top portion 108 of the ground plane at a shorter distance compared to a quarter of wavelength where no top dielectric loading is present. This can reduce substantially forward protrusion and, thus, make the array more conformal by its design.

In one specific configuration, an antenna element 102 may protrude above the top portion 108 of the ground plane by 0.03-0.05 wavelength ($\lambda$) of the lowest operating frequency of the antenna, and the thickness of the dielectric layers 112 and 113 can be around 0.05$\lambda$; thus, the total antenna height above the ground plane may be 0.1$\lambda$ or less at a lower end of an operation band (e.g., half of an inch for an array starting to operate from 2 gigahertz (GHz)). Additionally, an example antenna array 100 can be formed of the antenna elements 102 described herein as tightly coupled dipoles, which can have an inherent bandwidth of 4:1 and/or wider. This may allow operation at S bands (e.g., 2-4 GHz), X bands (e.g., 8-12 GHz), and/or the like. The tightly coupled dipole elements, as used in examples described herein, can create lines of current across apertures of the antenna array 100.

In addition, for example, one or more of the antenna elements 102 can include integrated impedance matching network components to facilitate transforming impedance of the antenna elements 102. This can facilitate supporting balanced (differential) transmission lines using unbalanced (e.g., single-ended) ports connected to the feed portion 104, such as coaxial transmit/receive connectors, and/or the like. In one configuration illustrated in FIGS. 2-4, the antenna elements can include a balun 120, a first impedance transformer 130 on one side of the balun 120, and a second impedance transformer 140 on the other side of the balun 120. In an example, the balun 120 can be a double-Y balun 120, as depicted. Integrating such components in the antenna elements 102 above the ground plane (e.g., above top portion 108 of the ground plane) can allow for a lower profile structure of the ground plane and/or an area below the ground plane, and thus the antenna array 100, as such components need not be included within or below the ground plane.

Furthermore, the antenna elements 102 can include one or more anomaly suppressing components to cancel common-mode resonances exhibited in portions of the antenna elements 102 during radiation. In an example, the anomaly suppressing components can include conductor branches 150, 151 that are connected to the second impedance transformer 140, and/or can also connect to a ground. The conductor branches 150, 151 can include, or can be coupled to, one or more chip resistors (e.g., high impedance resistors), for example, to cancel the common-mode resonances. Thus, a small amount of RF power can be dissipated in the one or more chip resistors used to suppress the common mode resonance, which can be made small and localized in frequency.

Figure 4:
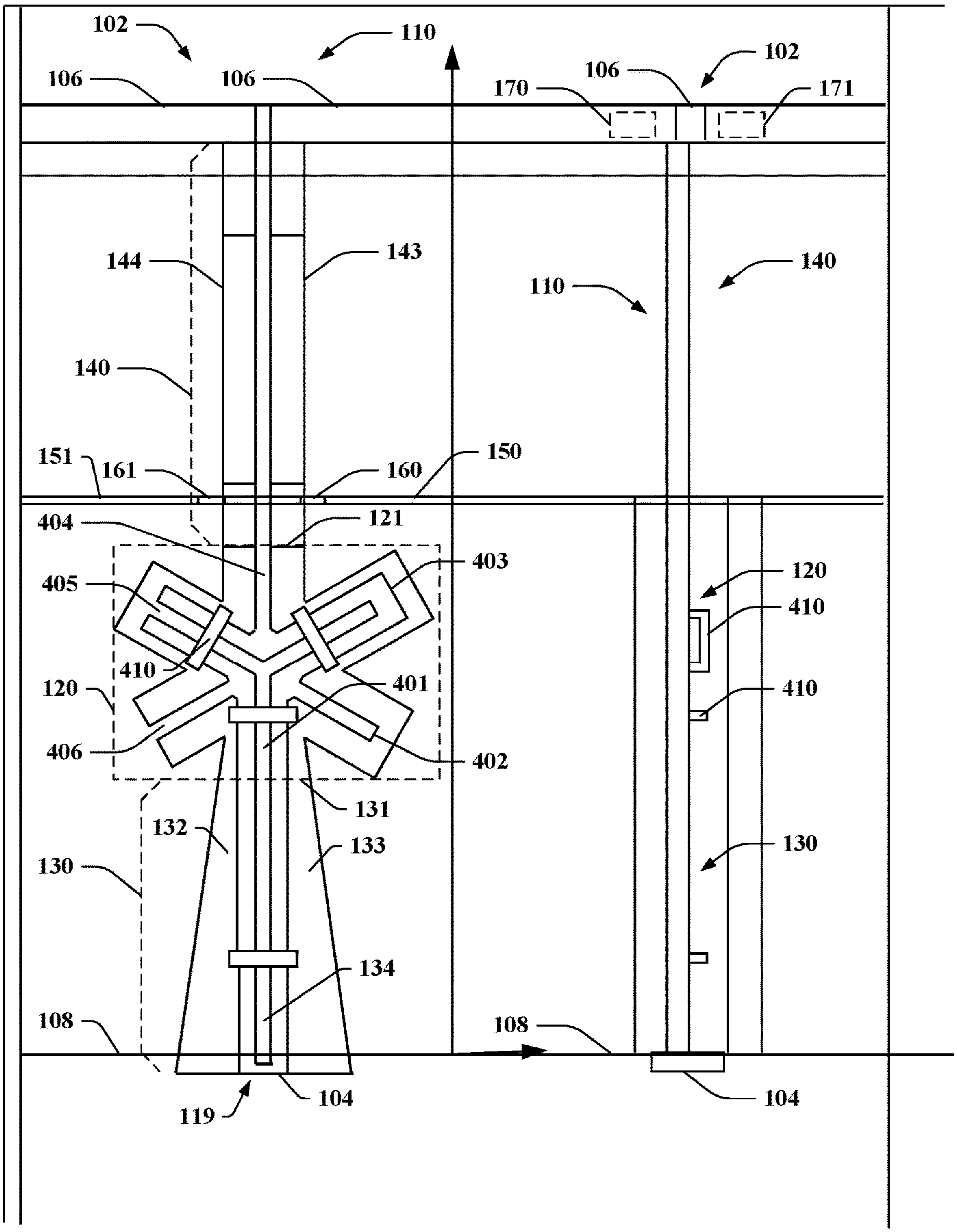
FIG. 4 illustrates a front view of adjacent antenna elements according to an embodiment.

FIG. 4 illustrates a front view and a side view of example antenna elements 102. The feed portion 104 may have two leads, which represent an unbalanced transmission line (e.g., microstrip stripline, coaxial cable, etc.). As illustrated in FIG. 4, the feed portion 104 connects directly to a first end 119 of the first impedance transformer 130. The feed portion 104 can include a standard connector (e.g., a subminiature version A (SMA) connector) so that a signal source can be modularly attached thereto.

In one example, the depicted antenna elements 102 can be disposed adjacent to one another in an antenna array. As described, the antenna elements 102 can include a feed portion 104, radiator arm(s) 106, etc., and can be connected in a top portion 108 of a ground plane. The antenna elements 102 can also include a balun 120, a first impedance transformer 130 on one side of the balun 120, and a second impedance transformer 140 on the other side of the balun 120. As described in one example, the antenna elements 102, or portions thereof, can be constructed via microstrip by etching a metal or other conductive material disposed on a PCB. However, the antenna elements 102 may be constructed by any other method or system and thus, should not be so limited.

The first impedance transformer 130 may include a set of microstrip lines which begin at feed portion 104 and extend to at least an input portion 121 of the balun 120. The set of microstrip lines can include one or more conductors, such as a center conductor 134, a left conductor 132, and a right conductor 133. The left and right conductors 132, 133 may be co-planar and/or may be of substantially equal dimensions. Additionally, the left and right conductors 132, 133 may be tapered microstrip sections connected with outer portions of the balun 120. Moreover, though the left conductor 132 and right conductor 133 are shown as substantially trapezoidal in shape, it is to be appreciated that substantially any shape can be used (e.g., rectangular, as shown in other Figures). The center conductor 134 of the first impedance transformer 130 can feed an interior portion of the balun 120, as depicted.

In one example, the length of the set of microstrip lines may be about one third of the height of the antenna elements 102. For instance, the first impedance transformer 130 can match impedance at the feed portion 104 of an electrical signal source, which is typically 50 Ohms, to the input portion 121 of the balun 120, that could be, for example, in the range of 75-110 Ohms. This may allow for maximum transmission of an electrical signal to the balun 120 while minimizing signal loss and/or reflection. In addition, as described, a signal in the first impedance transformer 130 may be unbalanced, according to some examples. In this example, the balun 120 can convert an unbalanced line (e.g., from the first impedance transformer 130) to a balanced line for the radiator arm 106. In one example, the balun 120 transitions from an unbalanced coplanar waveguide (CPW) to a balanced coplanar strip (CPS) for outputting via the radiator arm 106. In an example, this implementation of the balun 120 can be manufactured substantially precisely using minimal metal materials, and relatively small compared to other transitioning devices.

In addition, for example, the balun 120 can include a plurality of ports 401-406. For example, in obtaining complete transmission from port 401 (which may be unbalanced) to port 404 (which may be balanced), ports 402 and 405 can be shorted while ports 403 and 406 can be open-circuited. CPW bridges 410 can be utilized to maintain the outer ground conductors at the same potential, thus preserving a desired mode along the CPW lines. If the impedance of port 404 and the impedances of the CPW and CPS sections are all substantially equal, then the balun 120 can be substantially matched at all frequencies across a wide operational band. The length of the open-circuited and shorted ports in the balun 120 reach approximately one-eighth of a wavelength at the middle frequency of operational band. The positions of the CPW bridges 410 can help to improve impedance matching being properly adjusted. For example, the impedance matching components (e.g., the balun 120, first impedance transformer 130, second impedance transformer 140, etc.) used in this design can create a distributed electromagnetic system with complex interaction inside an antenna array 100 that includes many antenna elements 102 with corresponding impedance matching components. The CPW bridges 410 can help to achieve desired impedance transformation for the antenna array 100.

In an example, the left conductor 144 of the second impedance transformer 140 can couple the signal potential at the left conductor 144, which may be electromagnetically coupled to the center conductor 134 of the unbalanced line, to one of the radiator arms 106 of the radiator (e.g., the left leg of the dipole antenna as illustrated in FIG. 4). The right conductor 143 of the second impedance transformer 140 can couple the signal potential at conductor 143, which may be electromagnetically coupled to the two coplanar conductors 132 and 133 of the first impedance transformer 130, to another radiator arm 106, etc. Though some conductors are shown as separated into multiple integral conductor segments, it is to be appreciated that various conductors are not so limited and can include a continuous conductor or greater or lesser number of integral segments.

In one specific example, the impedance matching network components can transform an input impedance on the radiator arm 106 of close to a half of free space wave impedance that is around 200 Ohm to a reference of 50 Ohm impedance of standard coaxial transmit/receive connectors, which may be connected at feed portion 104. For instance, the first impedance transformer 130 can convert an impedance of a signal from the feed portion 104 to an intermediate impedance (e.g., from 50 Ohm to 100 Ohm). The balun 120 can balance the unbalanced signal to generate a balanced signal (e.g., of 100 Ohm). The second impedance transformer 140 can convert the intermediate impedance of the balanced signal to a target impedance (e.g., 200 Ohm).

As described, radiator arm 106 that form the radiator can include one or more dipole arms or other terminals into or from which radio frequency current can flow. The current and the associated voltage can cause an electromagnetic or radio signal to be radiated throughout and/or by antenna element 102. For example, a dipole can relate to an antenna element 102, or portion thereof, having a resonant length of conductor sized to enable connection to a feed portion 104. For resonance, the conductor can have a size approximately one half of the operational wavelength at a higher end of an operation band and/or a smaller fraction at middle and lower end of the operational band. It should be understood that, while a dipole antenna element 102 is illustrated, any other type of radiators may be employed, and the dipole is shown herein for illustrative purposes.

Figure 5:
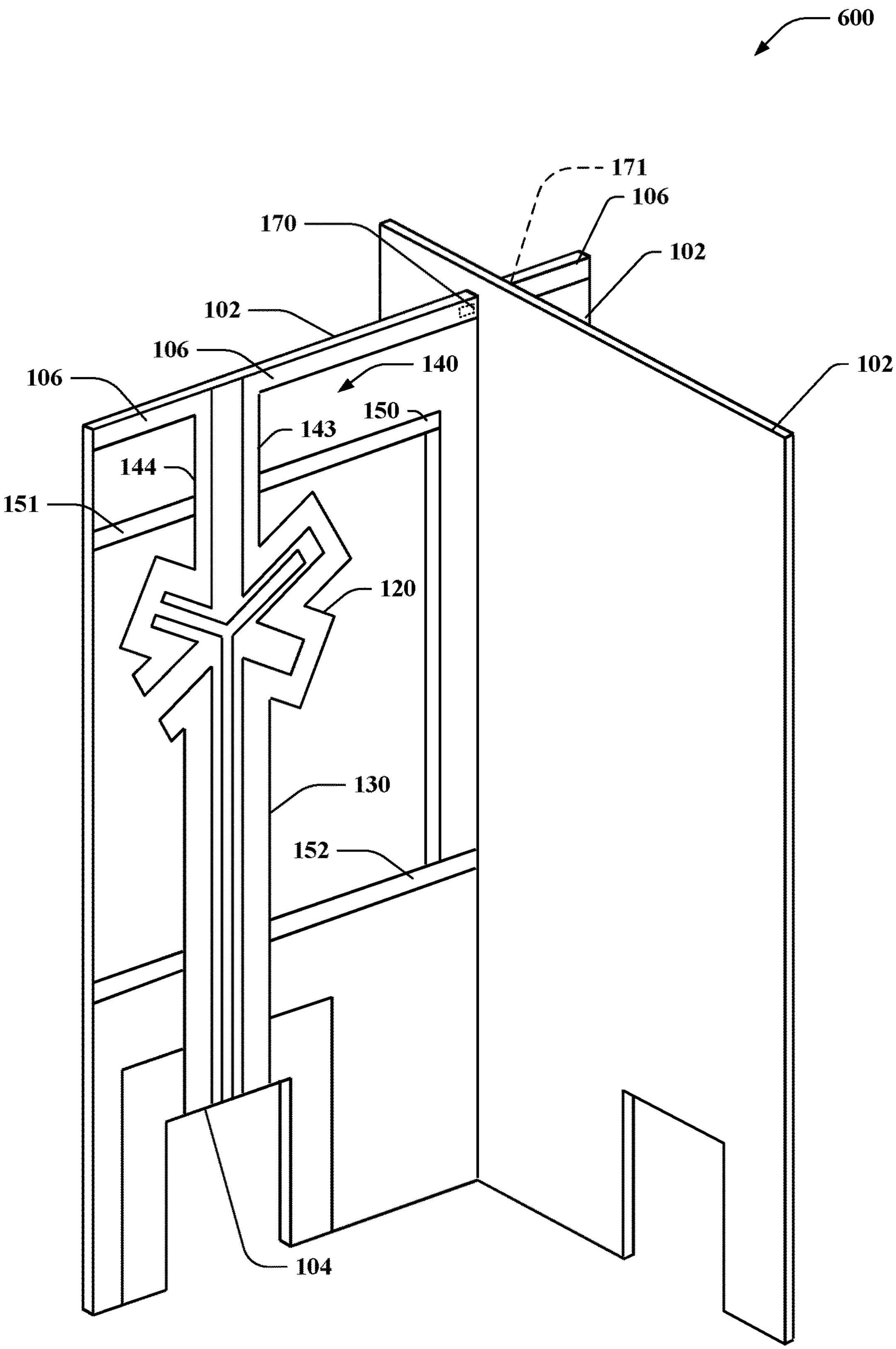
FIG. 5 illustrates a front perspective view of an antenna element with anomaly suppressing conductors according to an embodiment.

Moreover, in an example, one or more of the dipole arms can include one or more coupling elements 170 and/or 171 (e.g., a surface-mount device (SMD) coupling capacitor, inductor, and/or resistor) that can contact or otherwise connect to other dipole arms (or coupling elements thereof) of adjacent antenna elements 102. Referring to FIGS. 4 and 5, for example, coupling element 170 can be disposed on a dipole arm 106 of the antenna element 102 and another coupling element 171 can be disposed on a dipole arm 106 of an adjacent antenna element 102 near a point of intersection with a perpendicular antenna element 102. The coupling elements 170 and 171 can be disposed with some gap to allow passing of the perpendicular antenna element 102 between the antenna elements with coupling elements 170 and 171 for orthogonal polarization. In one example, the capacitance, inductance, and/or resistance value of the coupling elements 170 and/or 171 can correspond to an operational band of the antenna array. It is to be appreciated that the coupling element 171 is not explicitly shown in FIG. 5 as its view is blocked by the perpendicular antenna element; however, its approximate position is shown at 171 for reference.

As described herein, a ground plane of an antenna array 100 can be disposed at the base of the antenna elements 102. In this regard, substantially all components of the antenna elements 102 (e.g., the transformers 130, 140, the balun 120, the radiator arm(s) 106, etc.) can be located above the ground plane. Previous designs incorporate at least some of these components below the ground plane, which can have negative effects on the electrical performance due to higher power losses and parasitic anomalies in scanning regimes, and can also add bulk to the antenna array. The present design avoids these negative effects by including the components above the ground plane. The Figures show a top portion 108 of the ground plane, which may include a metal plate or other substantially flat portion upon which the antenna elements 102 are assembled. It is to be appreciated that additional side and/or bottom portions (not shown) can be provided to substantially enclose the bottom of the antenna array 100. The ground plane can serve also as an electrical ground for the antenna array 100, a heat sink for high power applications, etc.

The ground plane 108 of the antenna array 100 may be used to ground any grounding lines. For example, as illustrated in FIGS. 2 and 5, antenna element 102 can include one or more conductor branches 150, 151 that can operate to suppress anomalies in the form of common-mode resonances. In some radiator arms 106, a resonance at a particular frequency may be formed by the nature of the radiator arms 106 that form resonance loop circuits being electrically connected to other dipole elements in adjacent array cells. As a result, the common mode (unbalanced) current can flow on the conductor vertical branches 140 instead of wanted differential (balanced) current that may fail power exchange between the radiator arms 106 and the antenna feed 104. To compensate for such issue, conductor branches 150, 151 can be connected to ground (e.g., via the ground plane) and also to the second impedance transformer 140. In one example, the branches 150, 151 can couple to the second impedance transformer 140 via a discrete component (e.g., components 160 and 161 respectively disposed inline with branches 150, 151, and/or conductor arms 144 and 143). For example, the discrete components 160 and 161 can include chip resistors, such as a 1K resistor or similar resistor. The discrete components 160 and 161, in one example, can be soldered across gaps that may be formed on the PCB between the conductor arms 144 and 143 and the respective branches 150 and 151. The gap width can be selected based at least in part on power for the antenna array (e.g., a 0402 SMD resistor for lower power applications and up to a 1206 SMD resistor for high power applications, etc.).

The conductor branches coupled to the transformer 140 and ground, and having one or more resistors disposed therebetween can effectively suppress the common-mode resonance anomalies and may introduce some minor loss (e.g., 2-3 dB) in a very narrow frequency band around the resonance. As such, the location of connection of the conductor branches 150, 151 can be based on the frequency of resonation and/or a size of the discrete component. Moreover, for example, conductor branch 152 can connect to or otherwise be in electrical contact with similar conductor branches of other antenna elements 102 (e.g., adjacent antenna elements 102 in a row and/or in another perpendicular row in a plane array configuration), in one example, to form a common-mode cancelation network among the antenna elements 102.

Figure 6:
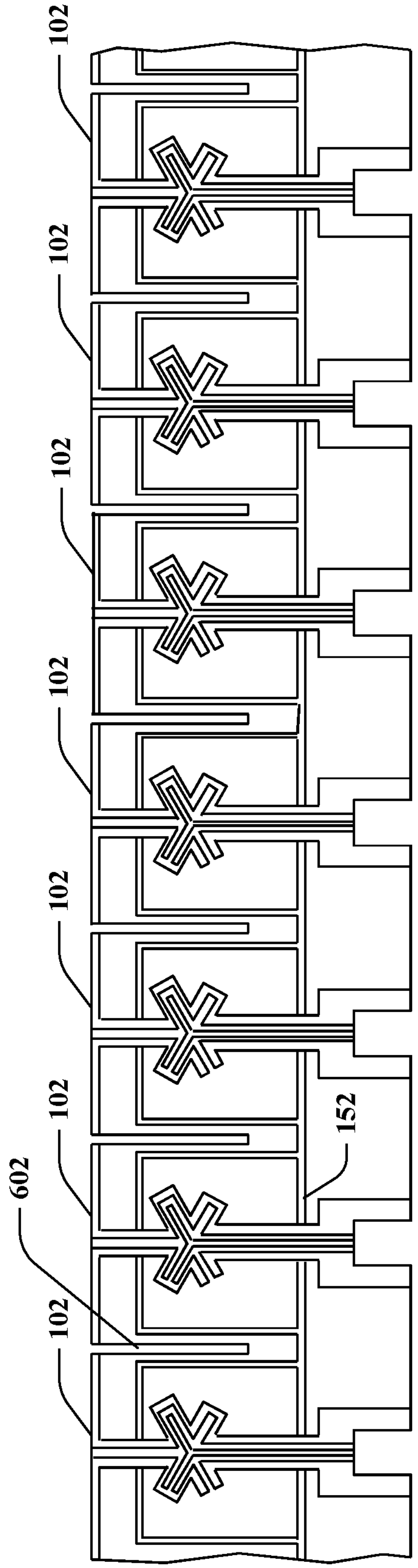
FIG. 6 illustrates a front view of a printed circuit board with multiple antenna elements according to an embodiment.
Figure 7:
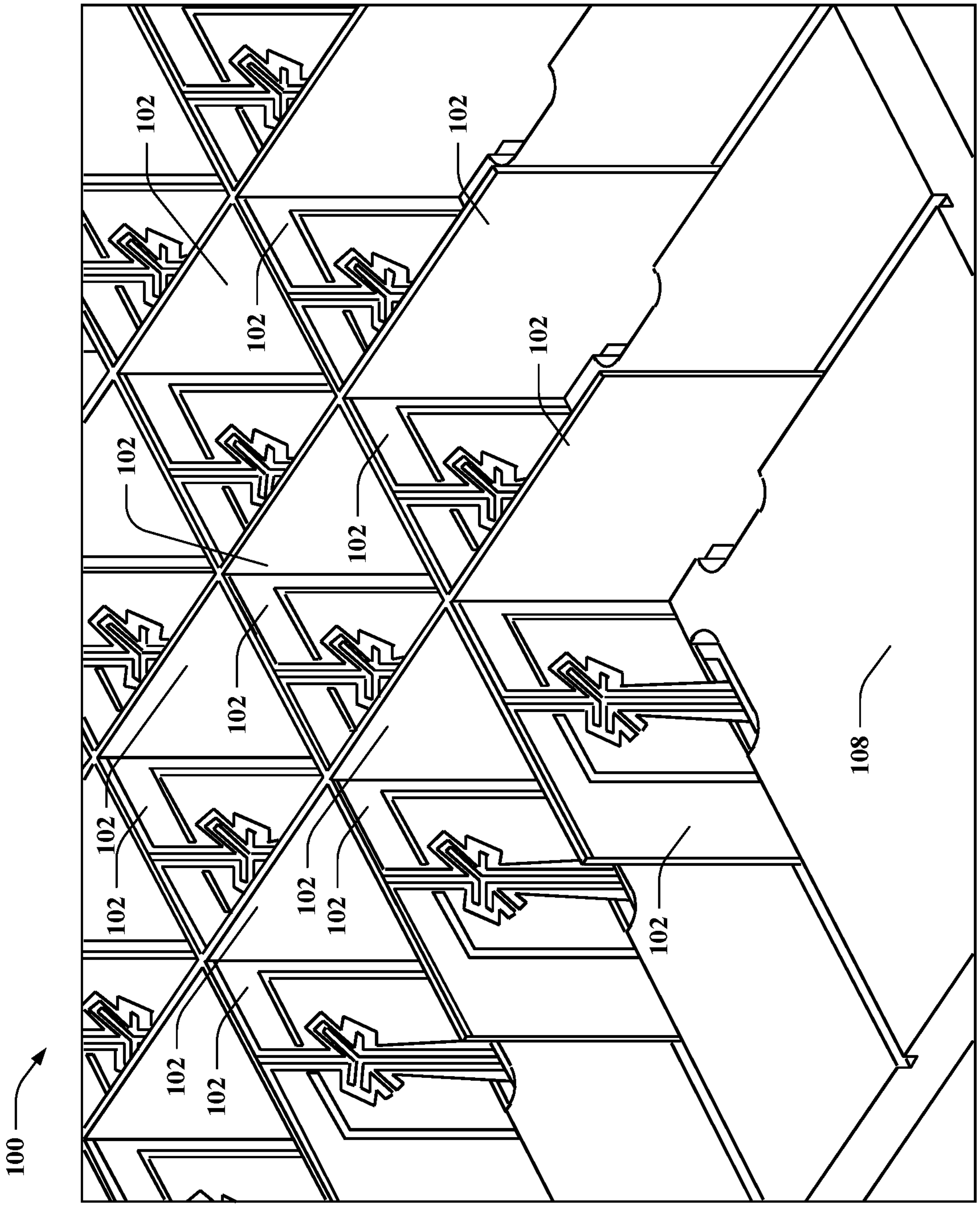
FIG. 7 illustrates a perspective view of an antenna array according to an embodiment.

FIG. 6 illustrates the antenna elements 102 printed on a PCB. As illustrated, the antenna element is printed on the PCB by providing a PCB and etching the PCB to form the previously-discussed components, conductors, etc. of each antenna element 102. In one specific example, the antenna elements 102 can comprise the components printed on 12-mil Duroid or other RF/microwave substrate of particular thickness. As illustrated in FIG. 6, each PCB can include a series of antenna elements 102 printed thereon. The PCBs can be used as a linear array as in FIG. 6 to provide single linear polarization. In another example, however, the linear array can be substantially perpendicularly attached together with one or more other linear arrays, as illustrated in FIG. 7 where the corresponding vertical boards (both in the x and y directions) include antenna elements 102 to form a plane array 100. In one example, the antenna elements 102 stacked perpendicularly can form a number of cells enclosed by the antenna elements 102, and can include reactive and/or resistive overlays at unit cell boundaries. In one example, in this configuration, two orthogonal linear polarizations can be supported by radiating different polarizations using radiator arms 106 of perpendicularly adjacent antenna elements 102.

In one example, FIGS. 4 and 5 illustrate two PCB boards attached in such manner where one antenna element 102 is shown front facing while another can be viewed at a side, and the antenna elements 102 can be point-like electrically interconnected, such that few soldering or other attachment operations may be used to assemble the array. For example, the anomaly suppressing conductors 152 can be electrically contacting or otherwise connected, as described, to form a common-mode resonance cancelation network across the array 100. In another example, a portion of radiator arms 106 of adjacent antenna elements 102 may be in electrical contact. Configuration of the PCB boards in perpendicular arrangement can create an eggcrate or grid configuration for dual linear polarized radiation, as shown in FIG. 7.

The eggcrate configuration can be defined by a plurality of the PCB boards comprising the antenna elements stacked in perpendicular relation at similar spacing. The spacing can correspond to spacing on the antenna elements such that each aperture in the eggcrate configuration comprises an antenna element, as shown in FIG. 7. Moreover, the PCBs can have slots (e.g., slot 602 in FIG. 6) to receive perpendicularly aligned PCBs (e.g., in similar slots of the perpendicularly aligned PCBs) such that the stacked perpendicular PCBs achieve a similar height from the ground plane. In addition, the PCBs can include conductors for the point-like electrical connections (e.g., conductors 152) such that the conductors of adjacent perpendicular PCBs contact when the PCBs are aligned in the respective slots. This configuration can ease manufacture of the antenna array 100 because the antenna elements 102 are printed on a card, and the cards can be stacked in an eggcrate configuration without requiring soldering at each joint. It is to be appreciated that this eggcrate configuration may have a polarization deficiency, which can be mitigated by controlling amplitude/phase of the adjacent antenna elements 102.

The ground plane is then provided at the bottom of the PCBs, such that the top portion 108 thereof can serve at least partially as an assembling base (e.g., for stacking the linear array cards). For example, the ground plane can include one or more flat metal sheets used to enable directive radiation from the antenna area. Dielectric layers 112 and 113 (FIG.

2) are disposed on top of this eggcrate structure to provide dielectric loading of the antenna elements 102 in the array 100, as described. The dielectric layers 112 and 113 comprise a few layers of low-loss dielectric material placed on top for improved impedance matching and bandwidth enhancement. The example constructions of a broadband CSA may allow for coverage from 3-6:1 and likely up to 10:1 and greater bandwidth.

The accompanying drawings, which are incorporated in and constitute a part of this specification, illustrate one or more examples of subject matter described herein. While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. An antenna array, comprising a plurality of antennas forming an array, a single common ground plane coupled to each of the plurality of antennas, wherein each of the antennas is disposed above the ground plane, a feed portion associated with each of the plurality of antennas and disposed below the ground plane, and a dielectric top cover coupled to the plurality of antennas, wherein each of the antennas of the plurality of antennas includes a pair of radiating elements and an impedance matching network coupled to the radiating elements, wherein the impedance matching network includes a first impedance transformer connected to the feed portion, a balun directly connected at one end to the first impedance transformer, wherein the balun has a central inner portion and a pair of opposed outer portions, and a second impedance transformer directly connected to the other end of the balun and to the radiator such that the balun is disposed between the first impedance transformer and the second impedance transformer, wherein the feed portion, the first impedance transformer, the balun and the second impedance transformer are connected and arranged in series, wherein the first impedance transformer includes a plurality of microstrip lines, wherein the plurality of microstrip lines includes a central conductor disposed between first and second edge conductors, wherein the first and second edge conductors have a relatively tapered shape and are generally the same size, and wherein the central conductor is coupled to the central inner portion of the balun and the first and second edge conductors are coupled respectively to each of the opposed outer portions of the balun.

2. The antenna array of claim 1, wherein the plurality of microstrip lines of the first impedance transformer form about a third of the height of the antenna.

3. The antenna array of claim 1, wherein each of the plurality of antennas are relatively perpendicular to the ground plane at a distance of less than 0.1 wavelengths at a lower end of an operational band.

4. The antenna array of claim 1, wherein the dielectric top cover includes a plurality of layers of a low-loss dielectric material so as to enhance the impedance matching and the bandwidth of each of the plurality of antennas.

5. The antenna array of claim 1, further comprising a plurality of anomaly suppressors for canceling common-mode resonance anomalies in a signal from the feed portion, wherein each of the plurality of anomaly suppressors includes one or more conductors coupled to the second impedance transformer and another adjacent one of the plurality of antennas to form a common-mode cancelation network among the antennas.

6. The antenna array of claim 1, wherein the feed portion comprises a plurality of leads to form an unbalanced transmission line.

7. The antenna array of claim 1, wherein the balun has a double-Y shape and comprises a plurality of ports.

8. The antenna array of claim 7, wherein the balun further comprises a plurality of bridge elements.

9. The antenna array of claim 1, wherein each of the radiating elements includes one or more coupling elements to facilitate coupling to one or more adjacent antennas.

10. The antenna array of claim 1, wherein the first impedance transformer converts an impedance of a signal from the feed portion to an intermediate impedance, and wherein the second impedance transformer converts the signal to a target impedance.

11. The antenna array of claim 1, wherein the plurality of antennas are disposed adjacent to one another on a plurality of printed circuit boards.

12. The antenna array of claim 11, wherein the plurality of printed circuit boards are disposed on the ground plane in an eggcrate configuration.

13. The antenna array of claim 11, wherein a first printed circuit board comprising a first set of the plurality of antennas is disposed perpendicularly to a second printed circuit board comprising a second set of the plurality of antennas.

14. The antenna array of claim 13, wherein the first printed circuit board and the second printed circuit board are disposed such that anomaly suppressing conductors of at least two of the plurality of antenna elements are in electrical contact.

* * * * *